No. 868,091. PATENTED OCT. 15, 1907.
T. HEMP.
NUT LOCK.
APPLICATION FILED MAR. 20, 1907.

Attest:
Edward N. Saxton
B. G. Phillips.

Inventor
Thomas Hemp.
By Shear Middleton Donaldson Shear
Attys.

UNITED STATES PATENT OFFICE.

THOMAS HEMP, OF MIDDLEBROOK, VIRGINIA, ASSIGNOR OF ONE-HALF TO J. H. SWORTZEL, OF MIDDLEBROOK, VIRGINIA.

NUT-LOCK.

No. 868,091.  Specification of Letters Patent.  Patented Oct. 15, 1907.

Application filed March 20, 1907. Serial No. 363,478.

*To all whom it may concern:*

Be it known that I, THOMAS HEMP, a citizen of the United States, residing at Middlebrook, Virginia, have invented certain new and useful Improvements in Nut-Locks, of which the following is a specification.

My invention relates to improvements in nut locks, and the object of the invention is to provide an exceedingly simple construction which may be produced at a cost no greater than the cost of the ordinary nut and which will operate to effectually lock the nut in place.

The invention comprises the particular construction hereinafter described and particularly pointed out in the appended claims.

The invention is illustrated in the accompanying drawings, in which:—

Figure 1:
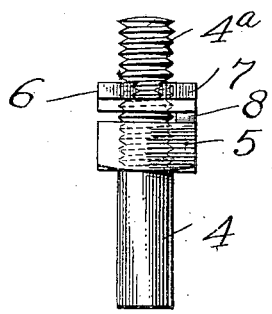
Figure 2:
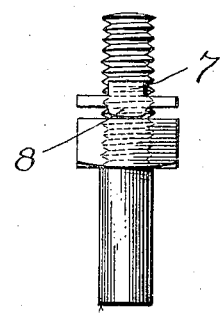
Figure 3:
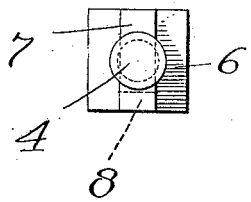

Figure 1 is a side elevation. Fig. 2 a similar view at right angles thereto. Fig. 3 is a plan view.

Referring by reference characters to the drawing, the numeral 4 represents a bolt, having the ordinary threaded end or portion 4ª, and 5 designates an ordinary nut screwed thereon.

The numeral 6 designates my improved locking device which consists of a square body, preferably of a size corresponding to the size of the nut upon which it is designed to operate and having a threaded opening whereby it may be screwed down upon the bolt and against the nut to hold the latter in place. It has located centrally upon its upper face a rib or flange 7, which being of less width than the bolt is interrupted by the opening through the center and it has its lower face projecting downward on one side of the bolt and in line with the rib or flange, preferably by forming thereon a rounded lug or extension, as shown at 8, designed to bear against the face of the nut. Constructed in this manner the central portion of the locking device is weaker than the side portions. The result of this is that when the device is screwed down upon the nut the projection 8 comes into contact with the face of the nut and upon further turning the locking device the weakened portion will allow the locking device to bend upwardly. The result of this is that the threaded portion of the rib or flange upon the upper side of the locking device will be forced into strong frictional engagement with the threads of the bolt, the weakened central portion acting directly as a fulcrum, and the further the locking device is turned the more will be the pivoting action and the greater the frictional engagement of the threads. Such a locking device is very effective in use and will not jar loose, while at the same time, owing to its simple shape it may be manufactured as cheaply and easily as an ordinary nut and yet will not require anything like as much material.

Having thus described my invention, what I claim is:—

In combination, a screw bolt, a nut threaded to engage the same and having a substantially plane upper face, and a locking member also threaded to engage the bolt and having a transverse rib of less width than the width of the bolt located centrally of its outer face, the inner face of the locking member on one side of the bolt and in line with the rib being projected whereby upon screwing the locking member down upon the nut the projected portion impinging upon the face of the nut will cause the threaded portion of the rib or flange to be forced into strong frictional engagement with the threads of the bolt, substantially as described.

In testimony whereof, I affix my signature in presence of two witnesses.

his
THOMAS × HEMP.
mark

Witnesses:
H. G. BAYLOR,
T. P. BYERS.